United States Patent [19]
Doi et al.

[11] Patent Number: 5,870,594
[45] Date of Patent: Feb. 9, 1999

[54] DATA TRANSFER SYSTEM AND METHOD

[75] Inventors: Toshio Doi, Kodaira; Takehisa Hayashi, Sagamihara; Tetsuo Nakano, Tokyo, all of Japan

[73] Assignee: Hitachi, Ltd., Tokyo, Japan

[21] Appl. No.: 963,857

[22] Filed: Nov. 4, 1997

Related U.S. Application Data

[62] Division of Ser. No. 308,346, Sep. 19, 1994, Pat. No. 5,737,589.

[30] Foreign Application Priority Data

Sep. 20, 1993 [JP] Japan .................................... 5-232827

[51] Int. Cl.$^6$ ........................................................ G06F 1/06
[52] U.S. Cl. ............................................. 395/558; 395/552
[58] Field of Search ................................. 395/552, 555, 395/556, 558, 559, 878, 880, 881

[56] References Cited

U.S. PATENT DOCUMENTS

| | | | |
|---|---|---|---|
| 4,811,277 | 3/1989 | May et al. | 370/419 |
| 4,989,175 | 1/1991 | Boris et al. | 395/552 |
| 5,086,500 | 2/1992 | Greub | 395/552 |
| 5,087,829 | 2/1992 | Ishibashi et al. | 327/152 |
| 5,233,314 | 8/1993 | McDermott et al. | 331/17 |
| 5,257,294 | 10/1993 | Pinto et al. | 375/376 |
| 5,309,561 | 5/1994 | Overhouse et al. | 395/556 X |
| 5,359,727 | 10/1994 | Kurita et al. | 395/558 X |
| 5,448,715 | 9/1995 | Lelm et al. | 395/559 |
| 5,454,116 | 9/1995 | Harigai et al. | 395/552 |

FOREIGN PATENT DOCUMENTS

| | | |
|---|---|---|
| 62-204359 | 9/1987 | Japan . |
| 62-263561 | 11/1987 | Japan . |
| 63-68959 | 3/1988 | Japan . |
| 2-201567 | 8/1990 | Japan . |
| 2-226316 | 9/1990 | Japan . |
| 3-257650 | 11/1991 | Japan . |
| 4-84354 | 3/1992 | Japan . |

*Primary Examiner*—Thomas M. Heckler
*Attorney, Agent, or Firm*—Fay, Sharpe, Beall, Fagan, Minnich & McKee

[57] ABSTRACT

The timing of digital signal sampling at a receiver is continuously adjusted relative to a master clock used to initiate sending, by controlling a phase difference between the receiver sampling clock and the master clock in accordance with feedback of an error signal determined by detecting deviation of sampling clock timing from desired reference timing during both start-up operation and normal operation. Propagation delay scattering in the individual devices is compensated for by setting the sampling clock at a desired reference timing at start-up. Propagation delay scattering caused by fluctuation during device operation is compensated for by detecting the deviation of the sampling clock timing from reference timing based on received digital signals during normal operation and then continuously correcting the sampling clock timing on the basis of the detection result.

15 Claims, 11 Drawing Sheets

DATA TRANSFER SYSTEM AND METHOD

This is a divisional application of U.S. Ser. No. 08/308,346, filed Sep. 19, 1994, now U.S. Pat. No. 5,737,589.

BACKGROUND OF THE INVENTION

This invention relates to a high-speed LSI system, more particularly to a high-speed data transfer system for a computer processor LSI system having peripheral LSIs, memory chips or the like with memory control capability, and I/O control capability or the like.

For realizing a high-performance computer it is important both to increase the speed of the processor LSIs and to speed up data transfer among the LSIs constituting the computer. One method available for increasing transfer speed is that in which the data are transmitted at a pitch which is shorter than the propagation time. A clock signal generation method for realizing this transfer method is taught, for example, by Japanese Laid-Open Patent Public Disclosure 62(1987)-204359 (Synchronized data transfer system). Japanese Laid-Open Patent Public Disclosure 2(1990)-226316 (Semiconductor device) discloses another clock signal generation method. Other publications disclosing a similar purpose include Japanese Laid-Open Patent Public Disclosures 62(1987)-263561, 63(1988)68959, 2(1990)-201567, 3(1991)-257650 and 4(1992)-84354.

SUMMARY OF THE INVENTION

Causes for scattering of propagation delay can generally be classified into two categories: (1) scattering by the individual devices owing to variance in the performance of LSIs, circuit boards, connectors and other such components and (2) temporal delay fluctuation due to fluctuation in the operating environment, specifically to drift of LSI temperature, ambient temperature and/or supply voltage during operation of the device. The amount of propagation delay scattering is the sum of delays by the two causes.

In Laid-Open Patent Public Disclosure 62(1987)-204359, the clock signal timing is fixed. As a result, delay scattering caused by variance manufactured into the LSIs, circuit boards etc. and by temperature and voltage fluctuation reduces the operating margin and may in some cases lead to operation errors. For avoiding operation errors, it is necessary to take these fluctuations into account during design. For example, for securing the required operating margin, it is necessary to lower the operating frequency or implement some other such countermeasure. In either case, performance is liable to be degraded. On the other hand, Laid-Open Patent Public Disclosure 2(1990)-226316 is equipped with a discrimination circuit for discriminating the appropriateness of the clock signal timing. While this makes it possible to absorb the scattering in the individual devices, the need for transferring a special data pattern for timing discrimination precludes application during normal operation and makes it difficult to absorb the scattering that accompanies temperature and voltage fluctuation during operation.

An object of this invention is to optimize clock timing in response to the main causes of propagation delay scattering, namely, (1) scattering in the individual devices and (2) fluctuation during device operation.

For overcoming the aforesaid problems, the present invention controls clock timing by detection of the deviation of the clock timing from a desired reference timing during both start-up operation and normal operation, and by using the result of the detection for applying feedback to the clock generator.

Delay scattering caused by variance manufactured into the circuit boards etc. is compensated for by setting the clock timing at a fixed desired reference timing at device start-up. In addition, delay fluctuation caused by temperature and voltage variation during normal operation is compensated for by detecting the deviation of the clock timing from the reference timing during normal operation and then correcting the timing on the basis of the detection result. The first compensation of timing shifts caused by variance built in during manufacture contributes to the improvement of product yield, eliminates the need for adjustments during manufacture, and thus reduces production cost. The latter compensation of timing shifts caused by temperature and voltage variation during operation enables use of a design with a narrower operating margin than has been possible with the prior art. High speed can therefore be achieved because there is no need to lower the operating frequency in order to secure the required operating margin.

DETAILED DESCRIPTION OF THE DRAWINGS

Figure 1:
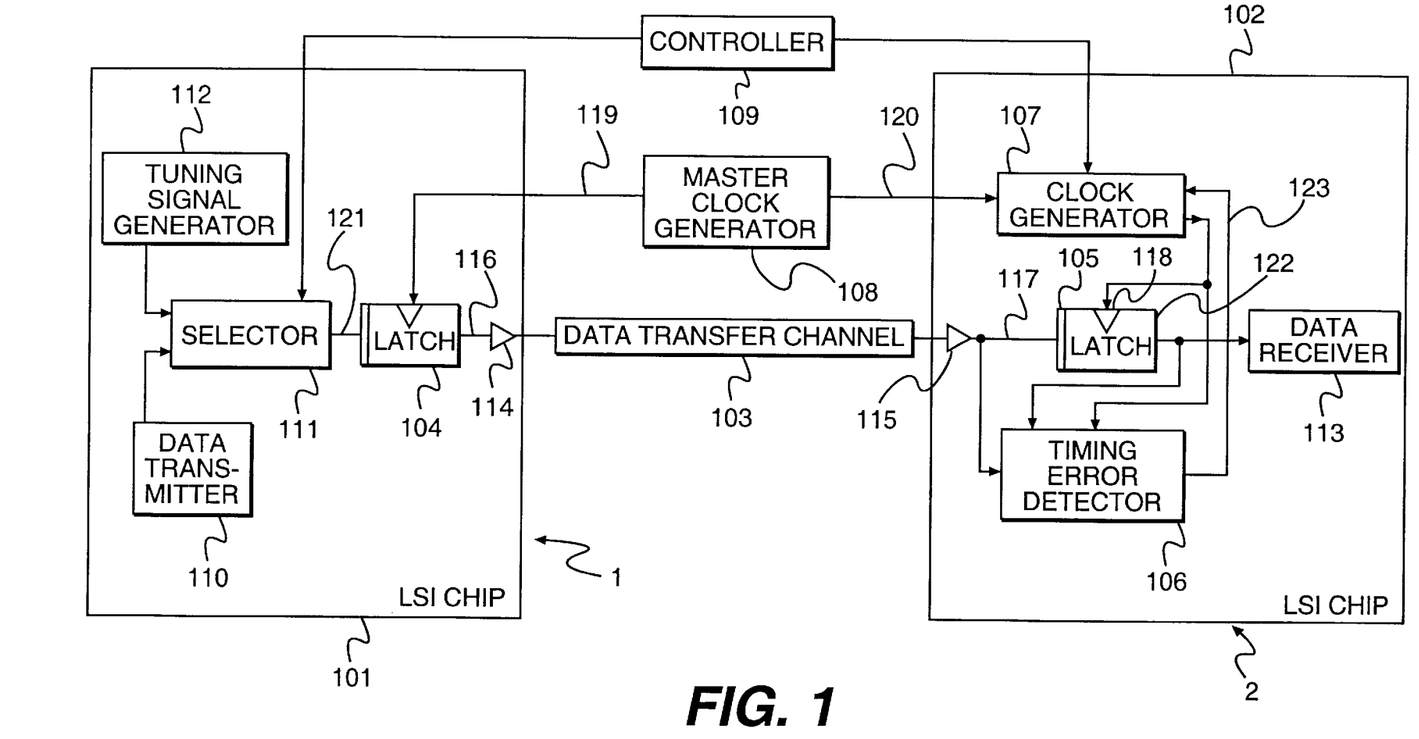
FIG. 1 is a block diagram of an embodiment of the invention.

FIG. 1 shows an example of the present invention applied to data transfer between LSI chips, namely a data transmitter LSI single chip 101 constituting a signal sender 1 and a data receiver single LSI chip 102 constituting a signal receiver 2.

In normal operation of the embodiment of FIG. 1, data are transferred from the data transmitter 110 in the data transmitter single LSI chip 101 to the data receiver 113 in the data receiver single LSI chip 102. The transfer path is as follows. First, the selector 111 selects the data transmitter 110 and the data are input to the data output latch 104 through the output terminal 121 of the selector 111. The data output latch 104 latches the data in accordance with a clock signal input from the output terminal 119 of the master clock generator 108 and outputs the data from the output terminal 116 of the data latch 104. The data from the output terminal 116 is output to the data transfer channel 103 (constituting a variable delay 3) through the output buffer circuit 114, and the data then arrives at the input buffer circuit 115. The signal carrying the data is buffered by the input buffer circuit 115 and sent to the data receiver latch 105 through the input terminal 117 of the data receiver latch 105. The data on the input terminal 117 is sampled in the data receiver latch 105 in accordance with a clock signal on the clock input terminal 118 and the sampled data is then sent to the data receiver 113 through the output terminal 122.

Figure 2:
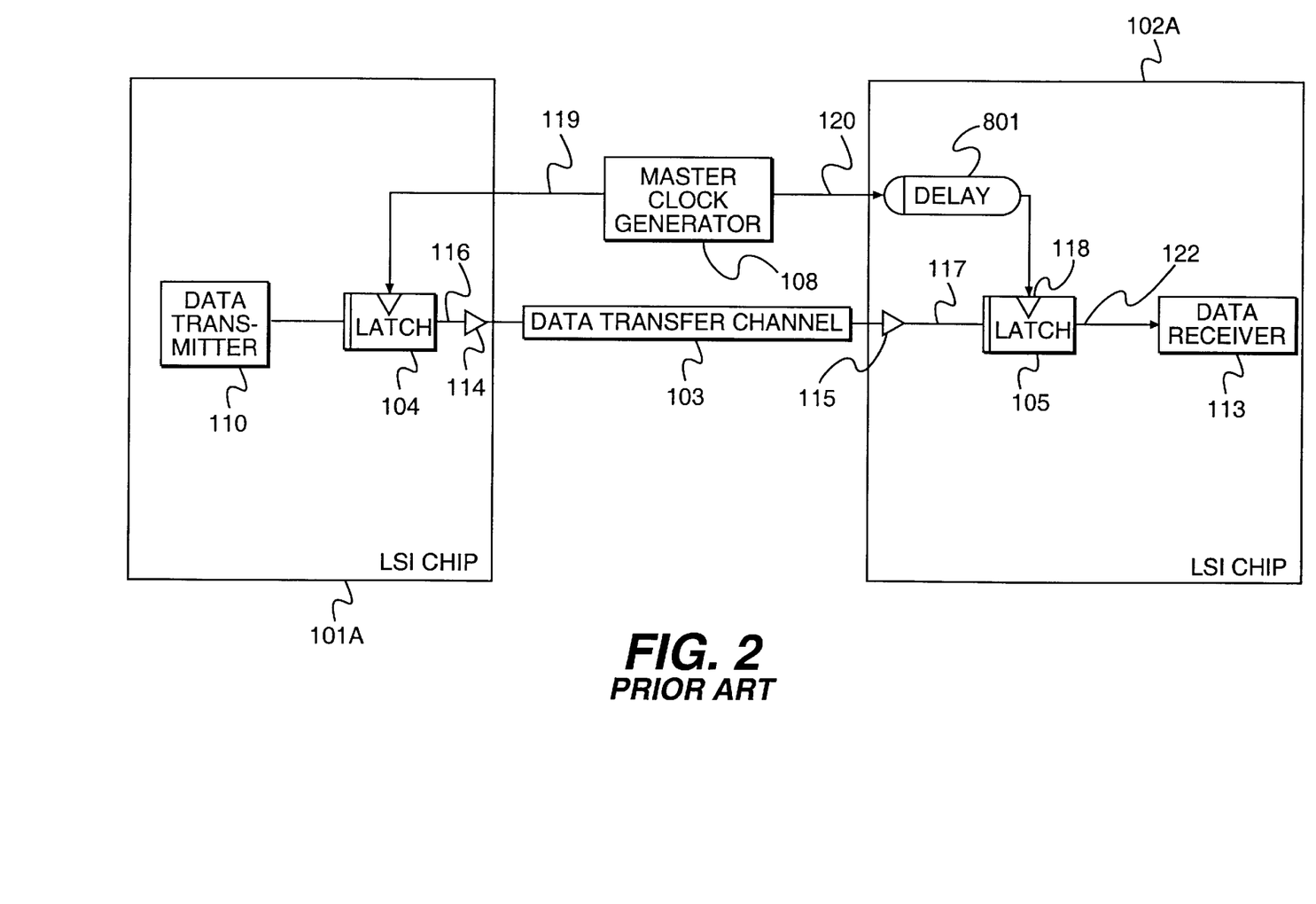
FIG. 2 is a block diagram of a prior art data transfer system.

FIG. 2 shows an example of a prior art system for comparison with the configuration in FIG. 1. In FIG. 2, the reference numerals 103, 104, 105, 108, 110, 113, 114, 115, 116, 117, 118, 119, 120 and 122 designate like components to those designated by the corresponding numerals in FIG. 1, and reference numeral 801 designates a delay circuit. The system of FIG. 2 resembles the embodiment of FIG. 1 in the point that data are transferred from the data transmitter 110 in the data transmitter chip 101A to the data receiver 113 in the data receiver chip 102A.

Figure 3:
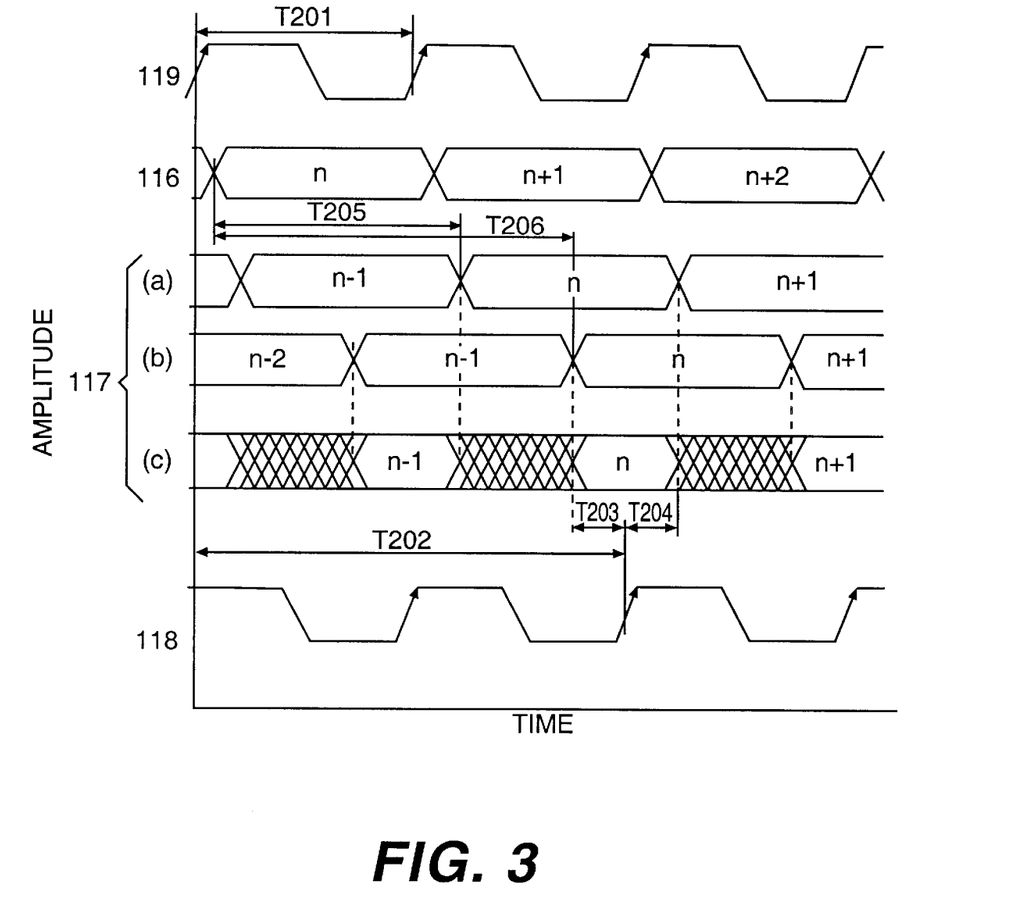
FIG. 3 is a diagram showing waveforms in a system according to FIG. 2.

FIG. 3 shows amplitude vs. time for an example of operating waveforms of the system of FIG. 2 as analyzed by the present inventors. Reference numerals 119, 116, 117 and 118 are adjacent the waveforms at the correspondingly numbered locations in FIG. 2. T201 is the pitch, T202 is the propagation delay of the delay circuit 801, T203 is the set-up time of the latch 105 and T204 is the hold time of the latch 105. T205 is the minimum value of the propagation delay between the data output latch 104 and the data receiver latch 105 and T206 is the maximum propagation delay between the data output latch 104 and the data receiver latch 105. The clock signal on the clock input terminal 118 of the data receiver latch 105 is generated by delaying the clock signal from the output terminal 120 in the delay circuit 801 by T202. When the propagation delay is T205 (minimum), the signal waveform on the input terminal 117 is as shown at 117(a). When the propagation delay is T206 (maximum), the signal waveform on the input terminal 117 is as shown at 117(b). As a result, the periods during which data can be taken into the data receiver latch 105 irrespective of the amount of propagation delay are those indicated by the signal 117(c). The following equation holds regarding T201 to T206.

$$T201-(T206-T205)=T203+T204 \quad \text{(Eq. 1)}$$

On the other hand, since for the data receiver latch 105 to operate normally it is necessary to secure a set-up time TS and a hold time TH, both of which are determined by the performance of the latch circuit, the following equations hold.

$$T203 \geq TS (TS : \text{set-up time}) \quad \text{(Eq. 2)}$$

$$T204 \geq TH (TH : \text{hold time}) \quad \text{(Eq. 3)}$$

When the operating margin TM of the delay circuit 801 (this margin also includes the deviation of the actual delay of the delay circuit 801 from the specification value, i.e. the clock skew, and the like) is taken into account in addition to (Eq. 1), (Eq. 2) and (Eq. 3), the following equation holds.

$$T201-(T206-T205) \geq TS+TH+TM \quad \text{(Eq. 4)}$$

(TM : operating margin)

TS, TH and TM here are values determined by the circuit characteristics and the like, and since (T206−T205) is the propagation delay scattering between the data output latch 104 and the data receiver latch 105, there is a limit to how far the propagation delay can be reduced. If (Eq. 4) is not satisfied, therefore, it becomes necessary to increase T201. However, this may degrade the performance of the system.

Figure 4:
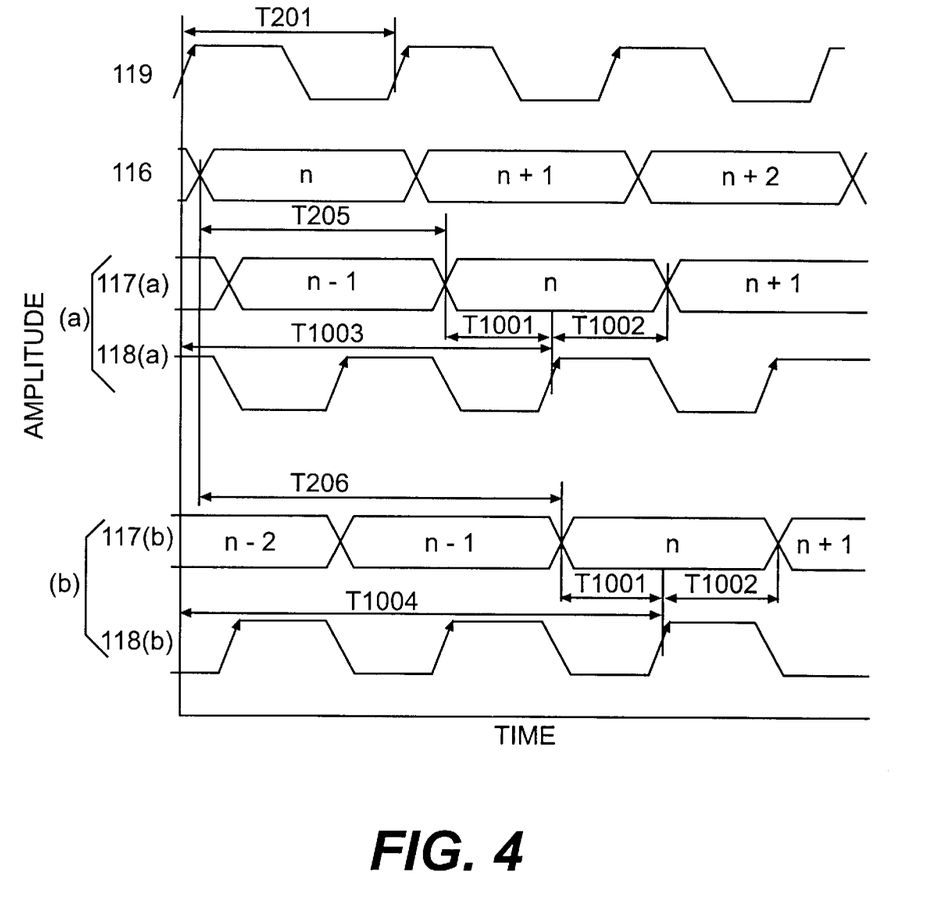
FIG. 4 is a diagram showing waveforms of the invention.

In the embodiment of the invention shown in FIG. 1, on the other hand, the clock timing of the data receiver latch 105 is constantly controlled to improve the timing, irrespective of any scattering and fluctuation that may arise in the propagation delay of the data transfer channel 103. FIG. 4 shows an example of the operating waveforms of the embodiment of FIG. 1, in which T1001 is the set-up time of the data receiver latch 105, T1002 is the hold time of the data receiver latch 105, 118(a) is the clock signal at terminal 118 at the time of latching the data 117(a) at the terminal 117, 118(b) is the clock signal at terminal 118 at the time of latching the signal 117(b) at the terminal 117, T1003 is the phase difference between the clock signal on the output terminal 119 and the clock signal 118(a), and T1004 is the phase difference between the clock signal on the output terminal 119 and the clock signal 118(b). In the present invention, the phase difference between the clock signal on the output terminal 119 and the clock signal on the clock input terminal 118 is varied between T1003 and T1004 so as to track the variation in the propagation delay of the data transfer channel 103 between T205 and T206, and thus to ensure that the data receiver latch 105 constantly samples the input signal at the fastest, most efficient timing. The effect of this continuous control of the sampling timing will be explained.

In FIG. 4, the following equation holds for T201, T1001 and T1002.

$$T201=T1001+T1002 \quad \text{(Eq. 5)}$$

Further, since TS and TH have to be secured for ensuring normal operation of the data receiver latch 105, the following equations also hold.

$$T1001 \geq TS \quad \text{(Eq. 6)}$$

$$T1002 \geq TH \quad \text{(Eq. 7)}$$

Considering the operating margin TM, moreover, the following equation also holds.

$$T201 \geq TS+TH+TM \quad \text{(Eq. 8)}$$

From a comparison of (Eq. 4) and (Eq. 8), it will be seen that for the same values of TS, TH and TM, the control of the present invention (Eq. 8) enables T201 to be reduced by (T206−T205) relative to the prior art (Eq. 4), thus providing an improvement in data transfer throughout. In addition, for the same value of T201 in the two equations, the present invention (Eq. 8) allows the operating margin TM to be set larger than does the prior art (Eq. 4), thus enabling improvements in operating stability, product yield and the like.

An explanation will now be given regarding the operation at the time that the sampling timing is made to track the propagation delay scattering in the embodiment of the invention shown in FIG. 1.

As stated earlier, the causes for scattering of propagation delay can be classified into: (1) scattering by the individual devices owing to variance in the performance of components and (2) delay fluctuation due to drift of the internal LSI temperature, ambient temperature and/or supply voltage during operation of the individual devices.

The operation in response to the first cause will be explained with reference to FIG. 1 and FIG. 5, which shows an example of the operating waveforms of the embodiment of FIG. 1. The controller 109 instructs the selector 111 to select the tuning signal generator 112. The signal from the tuning signal generator 112 passes from the output terminal 121, is received by the data output latch 104, and then passes from the output terminal 116, through the output buffer circuit 114, the data transfer channel 103, the input buffer circuit 115, and the input terminal 117 to be sampled by the data receiver latch 105. As in the prior art systems, the sampled signal is sent to the data receiver 113. In the present invention the sampled signal is also sent to the timing error detector 106. The timing error detector 106 detects the timing error relative to the fixed reference best case timing and forwards the result as the error signal 123 to the clock generator 107. Since the error signal 123 corrects the clock signal that the clock generator 107 produces for the data receiver latch 105 based on the signal received from the master clock generator 108, the sampling timing of the data receiver latch 105 is set at the optimum (or desired) timing under prevailing conditions of delay. The important point here is that accurate setting of the timing at terminal 118 is ensured by using the output at terminal 122 of the data receiver latch 105, which conducts the actual sampling of data, as the variable input to the timing error detector 106.

Figure 5:
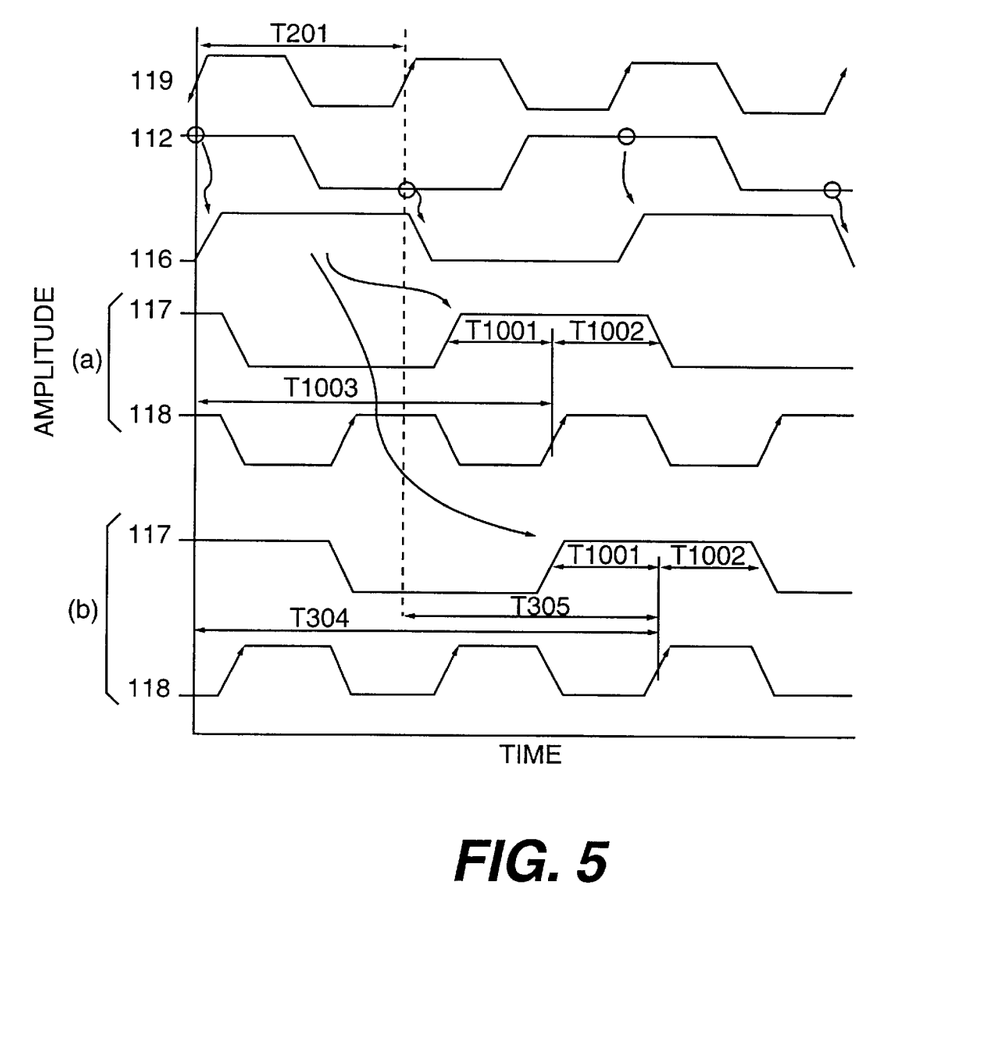
FIG. 5 is a diagram of waveforms of the invention.

FIG. 5 shows an example of the waveforms during the aforesaid operation, in which T1001 is the set-up time, T1002 is the hold time, and T1003, T304 and T305 are phase differences between the clock signal on the output terminal 119 and the clock signal on the clock input terminal 118. (Reference symbols (a) and (b) in FIG. 5 correspond to the same symbols used in FIG. 4.)

The output signal of the tuning signal generator 112 is inverted synchronously, with the pitch T201 so that a signal that inverts every T201 is output from terminal 116. In this state, the timing is set to the optimum (or desired) timing if, as latching proceeds in the data receiver latch 105, the delay of the clock generator 107 is varied so that the data are sampled as it inverts every clock cycle. Since T304 is longer than T201, however, there is a possibility of T305 being mistakenly set instead of T304 as the phase difference between the clock signal on the output terminal 119 and the signal on the input terminal 117. Where it becomes necessary to prevent this, it suffices to adopt the operation shown in FIG. 6, for example.

Figure 6:
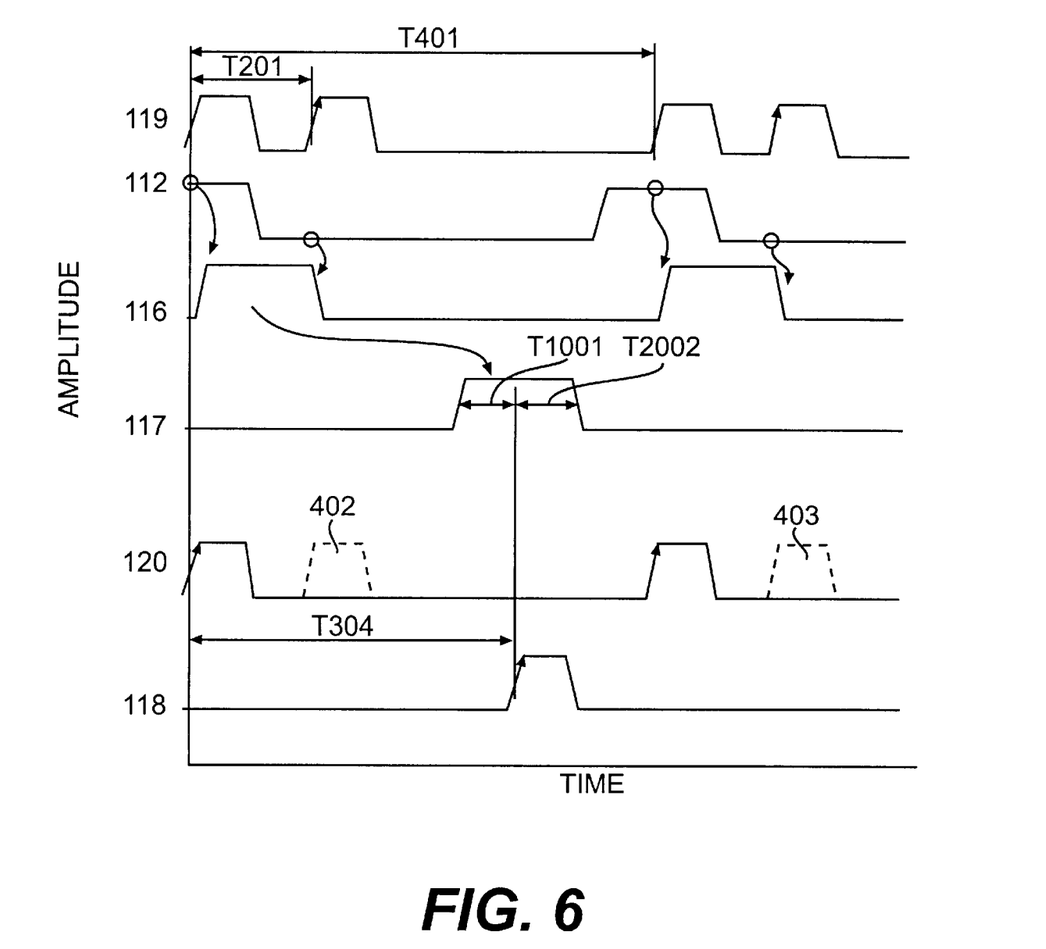
FIG. 6 is a diagram of waveforms of the invention.

In FIG. 6, T401 is the period of the output signal of the tuning signal generator 112, and 402 and 403 are waveforms of suppressed signals on the output terminal 120. In the example according to FIG. 6, the master clock generator 108 suppresses waveforms 402 and 403 in the signal sent out from the output terminal 120 but does not carry out a similar suppression with respect to the signal sent out from the output terminal 119. As a result, different clock signals are sent out from the two terminals. In addition, the period T401 is set longer than the period of T304. Under these conditions, setting, i.e. controlling, of the clock generator 107 is completed by setting T304 for conducting latch 105 to sample high level input signal.

Figure 7:
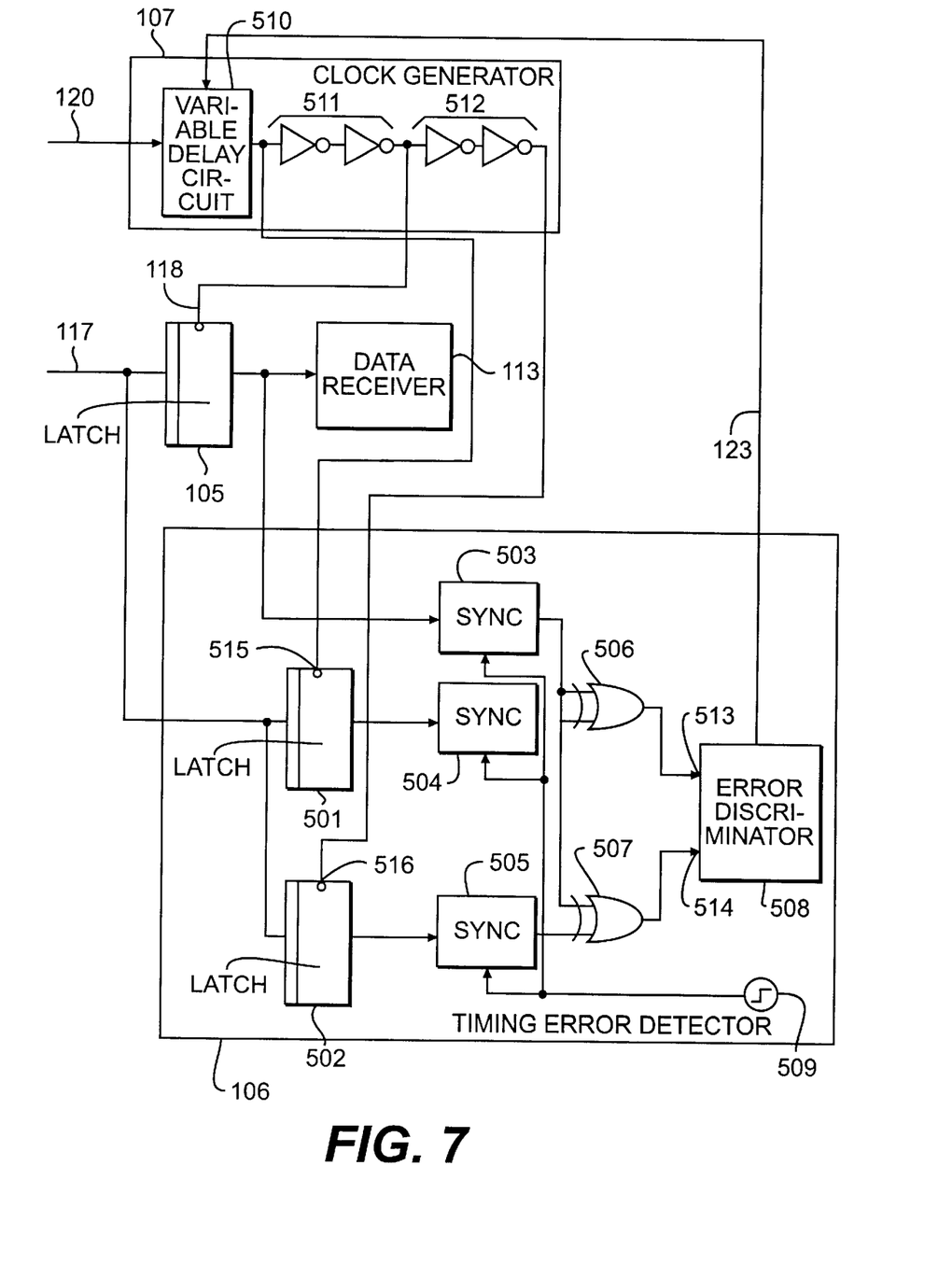
FIG. 7 is a block diagram of an example configuration of one portion of the system of FIG. 1.

An explanation will now be given of an example according to the invention for conducting the tracking operation with respect to changes in propagation delay during device operation. FIG. 7 shows an example of the configuration of the timing error detector 106 and the clock generator 107 shown in FIG. 1.

In FIG. 7, the propagation delays of the delay circuits 511, 512 are fixed, but the delay of the variable delay circuit 510 varies with the error signal 123. Owing to the configuration of the clock generator 107, the clock pulses of the data receiver latch 105 and the error detection latches 501, 502 always rise in the order of the clock input terminals 515, 118 and 516.

Figure 8:
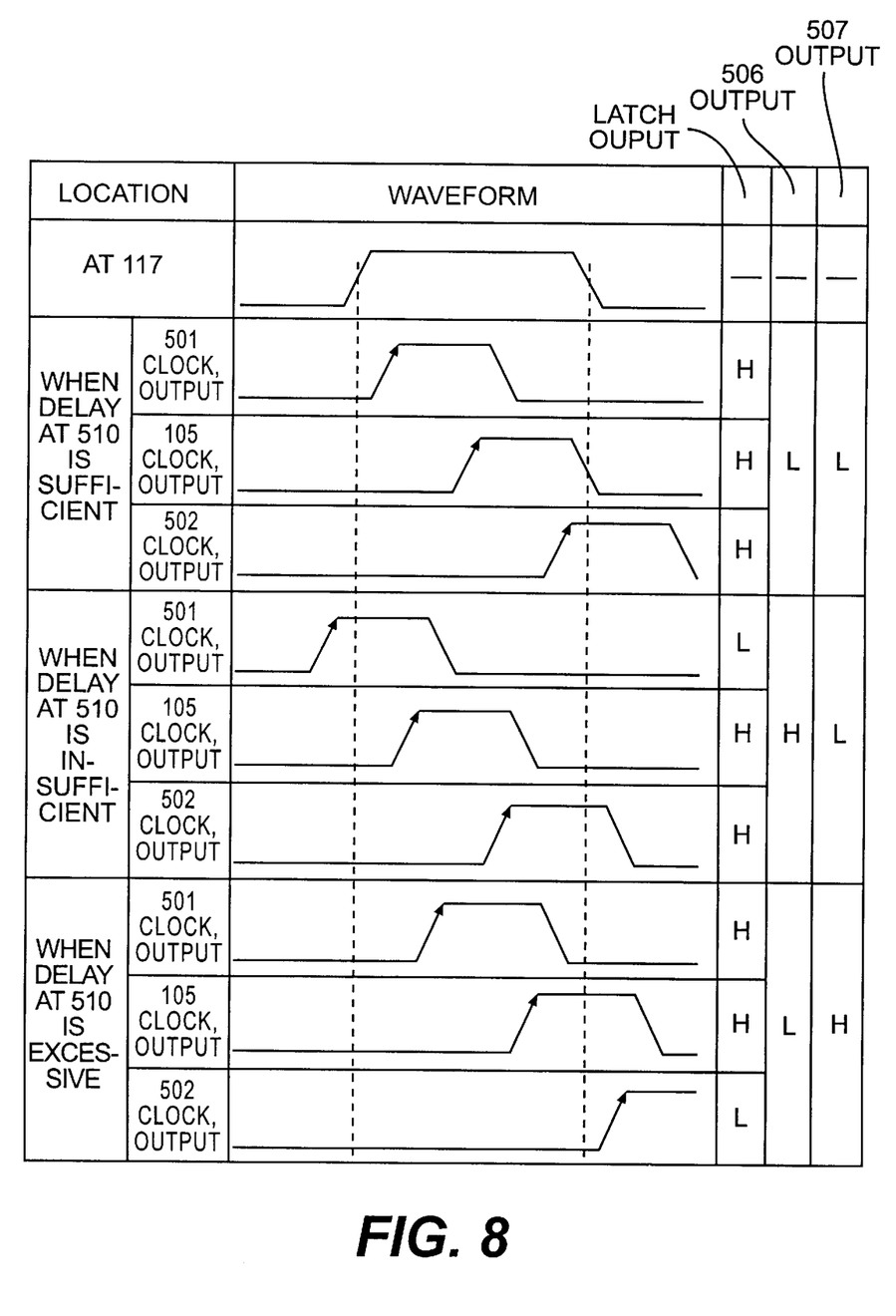
FIG. 8 is a diagram showing the time relationship between a clock signal and an input terminal signal, and the relationship between EOR circuits and outputs.

FIG. 8 shows the time relationship between these clock signals, the signal on the input terminal 117 and the input terminals, and the relationship between these clock signals and the outputs of the exclusive OR (EOR) circuits 506, 507. In the case where the delay of the variable delay circuit 510 is properly set, i.e. sufficient, the outputs of the error detection latch 501, the data receiver latch 105 and the error detection latch 502 are all high level (H) and, therefore, the outputs of the exclusive OR (EOR) circuits 506 and 507 are both low level (L). When the delay of the variable delay circuit 510 is too short, the output of the error detection latch 501 is L and the outputs of the data receiver latch 105 and the error detection latch 502 are H, whereby the output of the EOR circuit 506 is H and the output of the EOR circuit 507 is L. As a result, it is possible to correct the delay to the appropriate value by increasing the delay of the variable delay circuit 510. In the reverse case, i.e., when the delay of the variable delay circuit 510 is too large, i.e., excessive, the output of the EOR circuit 506 is L and the output of the EOR circuit 507 is H, and, as a result, it is possible to correct the delay to the appropriate value by decreasing the delay of the variable delay circuit 510. The example of FIG. 8 is based on the assumption that the phase difference between the clock input terminals 515 and 516 is set smaller than the pulse width on the input terminal 117 (sum of T301 and T302), the phase difference between the clock input terminals 515 and 118 is set greater than the set-up time of the data receiver latch 105, and the phase difference between the clock input terminals 118 and 516 is set larger than the hold time TH of the data receiver latch 105. What is important in this embodiment is that since the output of the data receiver latch 105 which actually samples the data are used for error detection, the tracking operation can be conducted accurately. The synchronization circuits (SYNC) 503, 504, 505 were included in the circuit of FIG. 7 for synchronizing the outputs of the error detection latches 501, 502 in accordance with the clock signal from the clock source 509 and thus stabilizing the operation of the error discriminator 508 by preventing operational errors that might otherwise result from metastable operation of the latches. The synchronization circuits 503, 504, 505 are, however, not essential to the invention and it is possible to eliminate them by adopting some other method, such as, for example, appropriately setting the time constant of the error discriminator 508.

As was pointed out earlier, propagation delay scattering is of two types: (1) scattering by the individual devices and (2) scattering owing to fluctuation in the operating environment during operation. This invention deals with the first type by transferring special data at start-up and using the special data to correct the clock timing. It deals with the second type by detecting and correcting any deviation in the clock timing from the optimum (or desired) timing during normal operation. The invention thus provides two operating modes. The characteristics of each are explained in the following.

(1) In the first mode, the range of the scattering is large, and the operation is executed within start-up sequences of machine, it is required to complete the timing correction quickly. Because of this, the time constant of the feedback loop for the optimization of the timing is preferably set to be short.

(2) The second mode is executed during normal operation. While the present invention prevents operational errors, the scattering dealt with is caused by more gradual changes, such as changes in temperature, voltage and the like. As a result, a longer time constant is adequate (or preferable).

Figure 9:
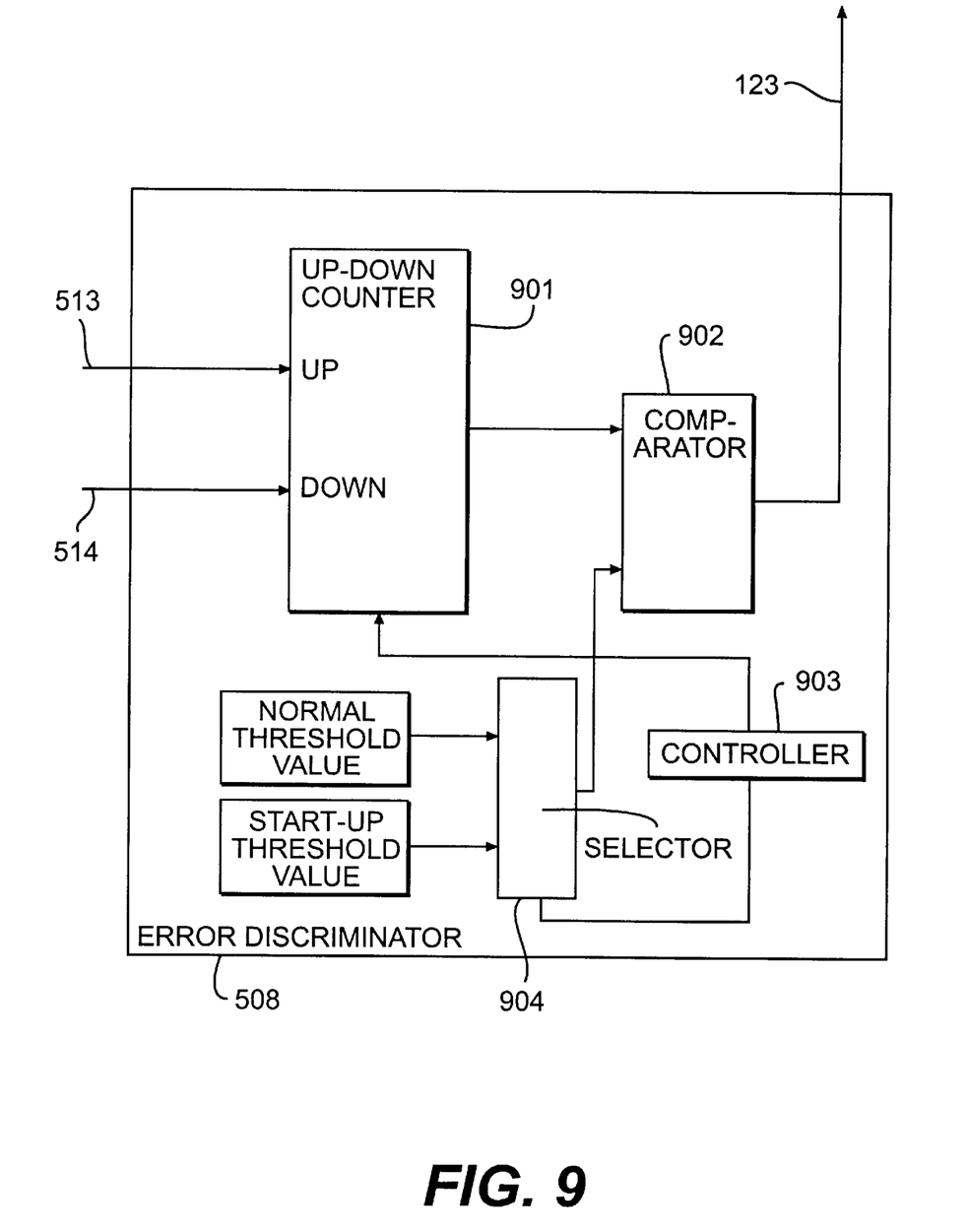
FIG. 9 is a block diagram of an example configuration of one portion of the system of FIG. 1.

FIG. 9 shows the structure of the error discriminator which deals with these two conditions, (1) & (2), by making the time constant of the feedback loop of the error discriminator 508 variable. The exclusive OR (EOR) circuits 506, 507 are connected to the input terminals 513, 514 of the up-down counter 901, and the up-down counter 901 counts up and down in response to the timing error detection results. The outputs of the up-down counter 901 and the selector 904 are compared in the comparator 902, and when the absolute value of the up-down counter 901 output exceeds the output the selector 904, an error signal 123 to this effect is output and used for timing correction. The time constant of the error discriminator can be changed by changing the value of the selector 904 output. In the error discriminator of FIG. 9, the controller 903 first resets the up-down counter 901 at the start-up and then selects the fixed "start-up threshold value." The comparator 902 compares the output of the up-down counter 901 with the threshold value for start-up and outputs the result of the comparison as the error signal 123. During normal operations, on the other hand, the selector 904 selects the "normal threshold value" and inputs it to the comparator 902. As a result, appropriate time constants can be independently set for (1) start up and (2) normal operation.

Figure 10:
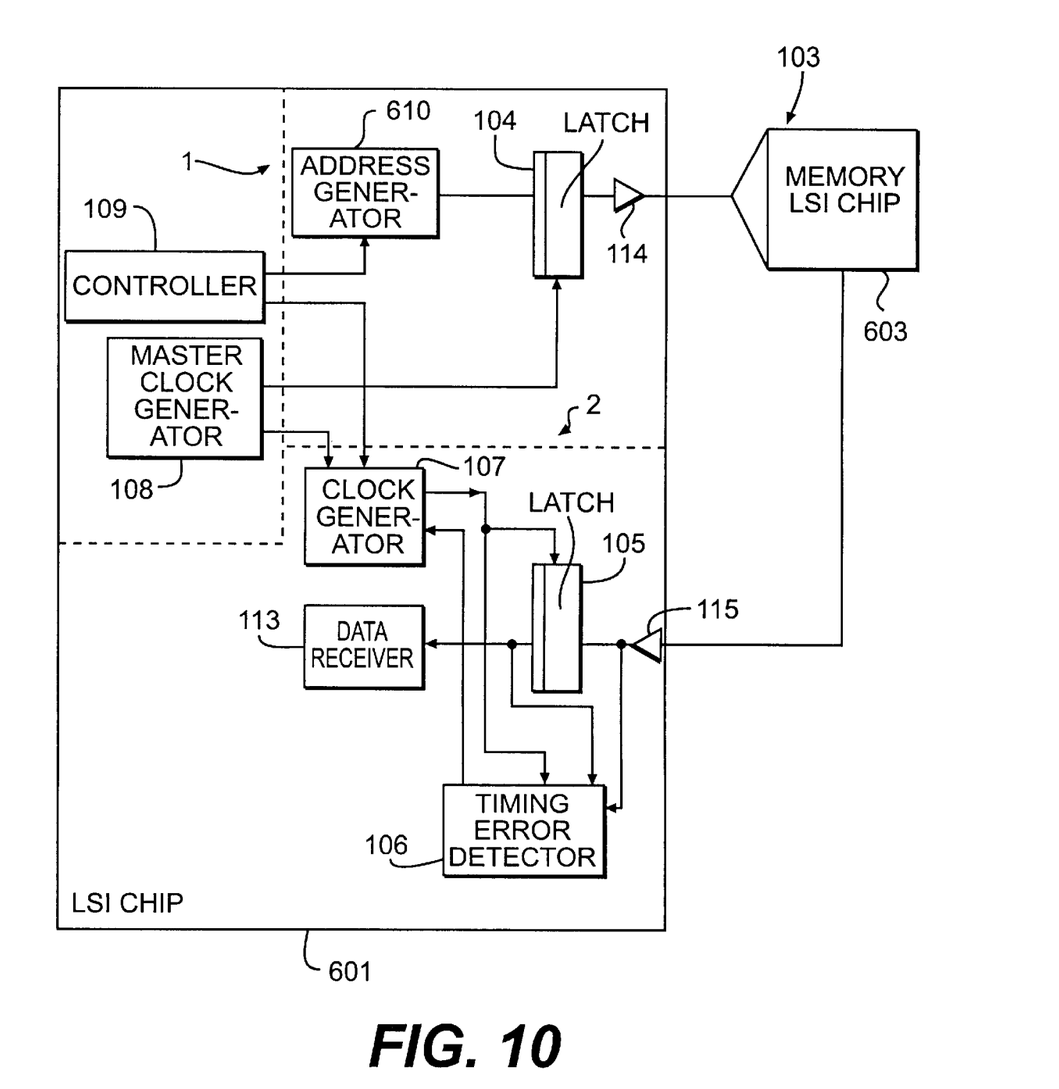
FIG. 10 is a block diagram of the invention applied to memory access.

While the embodiment of FIG. 1 applies the present invention to data transfer between LSIs, FIG. 10 specifically applies to transfer between a processor LSI 601 and an external memory LSI 603. The portions relating to memory writing operations are omitted from FIG. 10. For reading from the memory in this embodiment, the address generator 610 first generates the address to be read, the generated address is latched by the address output latch 104, and the latched address is sent to the memory LSI single chip 603 through the address output buffer circuit 114. The data at the address are read from the memory LSI 603, sent through the data input buffer circuit 115 to the data input latch 105 from where they are forwarded to the data receiver 113. The path between the address output latch 104 and the buffer 114 to the data input latch 105 and buffer 115 corresponds to the data transfer channel 103 in FIG. 1, and the memory LSI 603 access time corresponds to the propagation delay of data transfer channel 103. In addition, the components designated by numerals in FIG. 10 that correspond to those designated by the same numerals in FIG. 1 have the same structure and function. In FIG. 10, the signal sender 1 comprises elements 610, 104, 114; the variable delay 103 comprises memory 603; the signal receiver 2 comprises elements 105, 115, 106, 107, 113; the signal sender 1, signal receiver 2, master clock generator 108 and controller 109 are all on a single LSI chip 601.

Figure 11:
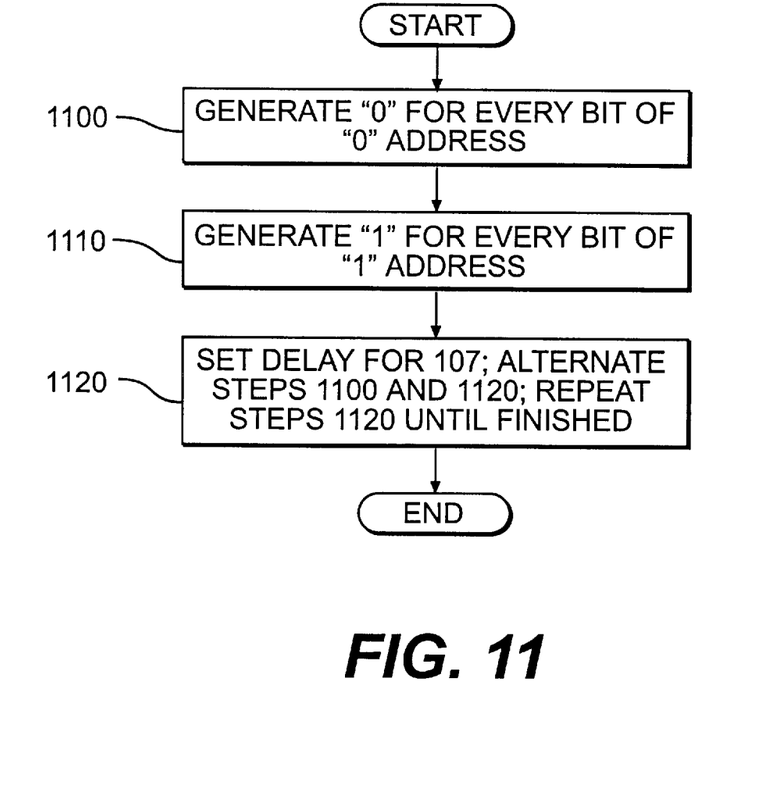
FIG. 11 is an example of a flowchart working the invention.

The previously described start-up mode and the normal operation mode according the invention are used in FIG. 10. The normal operation mode is similar to that of FIG. 1. The FIG. 10 start-up mode differs from that in FIG. 1 however, because the absence of generating data by use of a tuning signal generator like that designated as 112 in FIG. 1 makes it necessary to use a different configuration. FIG. 11 shows an example of a method of correcting timing at device start-up that can be used in FIG. 10.

In FIG. 11, the address generator 610 generates a 0 address and writes 0 for every bit of the 0 address as step 1100. The address generator 610 then generates a 1 address and writes 1 for every bit of the 1 address as step 1110. It thereafter continues to generate 0 addresses and 1 addresses alternately as step 1120, whereby the reading of the memory LSI 603 causes data that invert every cycle to be input to the data input latch 105. It is thus possible to achieve an operation that corresponds to that of FIG. 5 and can be used for timing correction. Since most computers already execute a memory check sequence at start-up, the method of FIG. 11 requires little additional software or hardware and can therefore be easily implemented.

Deviation of the clock timing from the fastest possible timing can be accomplished with high precision since deviation is detected from the very latch used for data sampling.

While edge-trigger type latches are used in the foregoing, the invention can be applied with no loss of effect to LSIs configured to sample data with level sense type latches.

By correcting the latch clock so as to set the timing at the optimum (or desired) timing under the present variable delay, the present invention can effectively deal with scattering of propagation delay caused by either (1) scattering by the individual devices or (2) fluctuation during device operation. Moreover, since deviation of the clock timing from the fastest possible timing is detected from the very latch used for data sampling, the invention can effectively achieve high precision correction. In addition, these effects of the invention produce the effects of increasing product yield, eliminating the need for adjustment during production, and promoting higher speed owing to margin reduction.

While the preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A digital signal handling system, comprising:

a digital signal input latch latching in the digital signal at a timing corresponding to a sampling clock;

a master clock generator generating a master clock for controlling timing of the system;

a first device initiating transmission of the digital signal according to timing of the master clock signal;

a transfer device introducing a variable delay between the initiating and the digital signal reaching said input latch;

a digital signal receiver receiving input of the digital signal from an output of said input latch;

a sampling clock generator generating the sampling clock at a variable delay with respect to the master clock signal, and having inputs of an error signal and the master clock signal; and a timing error detector having output of the error signal and inputs of the sampling clock, the digital signal at an input to the input latch and digital signal at the output of the input latch.

2. A digital signal handling system according to claim 1, wherein said transfer device is a memory LSI chip.

3. A digital signal handling system according to claim 1, further including an input buffer between said transfer device and said input latch;

an output latch; and an output buffer between said output latch and said transfer device, said output latch having a clock input directly receiving a master clock signal from said master clock generator for initiating the digital signal transfer.

4. A digital signal handling system according to claim 3, further including a controller providing control signals, one of which being connected to said sampling clock generator; and a digital signal transfer initiating circuit providing an initiating signal as input to said output latch and having a control terminal connected to said controller to receive a control signal.

5. A digital signal handling system according to claim 4, wherein said signal transfer initiating circuit is an address generator generating addresses of said memory.

6. A digital signal handling system according to claim 4, wherein said signal transfer initiating circuit includes a selector having two inputs;

a tuning signal generator providing a tuning signal to one of the inputs of said selector;

a data transmitter providing digital data to the other of the inputs of said selector; and said controller operating said selector to provide output of the tuning signal during start-up operation and thereafter provide output of the digital data during normal operation, and said controller further controlling said sampling clock generator to provide a sampling clock period during start-up operation that is different from the sampling clock period provided during normal operation.

7. A digital signal handling system according to claim 1, wherein said sampling clock generator includes a variable delay circuit having inputs of said error signal and said master clock signal and an output connected to said error detector to provide the sampling clock to the error detector at a variable delay relative to the master clock signal, a fixed delay circuit having an input connected to the output of said variable delay circuit and an output connected to said input latch to provide the sampling clock to the latch at a first fixed delay and a variable delay with respect to the master clock signal, and a second fixed delay circuit having an input connected to the output of said first delay circuit and an output connected to said error detector to provide the sampling clock to the error detector at the first fixed delay plus the second fixed delay plus the variable delay with respect to the master clock.

8. A digital signal handling system according to claim 7, wherein said error detector includes a first detector latch and a second detector latch having commonly connected inputs connected to the input of said input latch to receive the digital signal, said first detector latch being connected to receive the sampling clock from the output of said variable delay circuit, said second detector latch being connected to receive the output of said second fixed delay circuit, a first exclusive OR circuit having inputs of the output of said first detector latch and output of said input latch, a second exclusive OR circuit having inputs of the output of said input latch and output of said second detector latch, and an error discriminator comparing outputs of said first and second exclusive OR circuits and outputting said error signal.

9. A digital signal handling system according to claim 8, wherein said error discriminator further includes an up-down counter having an up input connected to the output of said first exclusive OR circuit, a down input connected to the output of said second exclusive OR circuit, a control signal reset input, and an output;

said error discriminator further including a selector outputting one of a normal threshold value and a start-up threshold value in response to a control signal input;

said error discriminator further including a controller providing said control signals in said selector and said up-down counter; and said error discriminator further including a comparator having input of an output of the up-down counter and output of the selector, and having an output of the error signal.

10. A digital signal handling system according to claim 9, wherein said transfer device is a memory LSI chip.

11. A digital signal handling system according to claim 10, further including an input buffer between said transfer device and said input latch;

an output latch; and an output buffer between said output latch and said transfer device, said output latch having a clock input directly receiving a master clock signal from said master clock generator for initiating the digital signal transfer.

12. A digital signal handling system according to claim 11, further including a controller providing control signals, one of which being connected to said sampling clock generator; and a digital signal transfer initiating circuit providing an initiating signal as input to said output latch and having a control terminal connected to said controller to receive a control signal.

13. A digital signal handling system according to claim 12, wherein said signal transfer initiating circuit is an address generator generating addresses of said memory.

14. A digital signal handling system according to claim 12, wherein said signal transfer initiating circuit includes a selector having two inputs;

a tuning signal generator providing a tuning signal to one of the inputs of said selector;

a data transmitter providing digital data to the other of the inputs of said selector; and said controller operating said selector to provide output of the tuning signal during start-up operation and thereafter provide output of the digital data during normal operation, and said controller further controlling said sampling clock generator to provide a sampling clock period during start-up operation that is different from the sampling clock period provided during normal operation.

15. Receiving device, comprising:

sampling clock generator generating a sampling clock for latching data transmitted from an external device at a timing according to the sampling clock; and timing error detector detecting deviation between said sampling clock and said data transmitted from said external device and outputting the detected deviation;

said sampling clock generator setting timing of the sampling clock based on said detected deviation.

* * * * *